W. C. RADDANT.
AUTOMATIC CONTINUOUS LIQUID TESTER.
APPLICATION FILED JUNE 26, 1916.

1,266,315.

Patented May 14, 1918.
2 SHEETS—SHEET 1.

Walter C. Raddant,
Inventor

By Geo. P. Kimmel.
Attorney

W. C. RADDANT.
AUTOMATIC CONTINUOUS LIQUID TESTER.
APPLICATION FILED JUNE 26, 1916.
1,266,315.
Patented May 14, 1918.
2 SHEETS—SHEET 2.
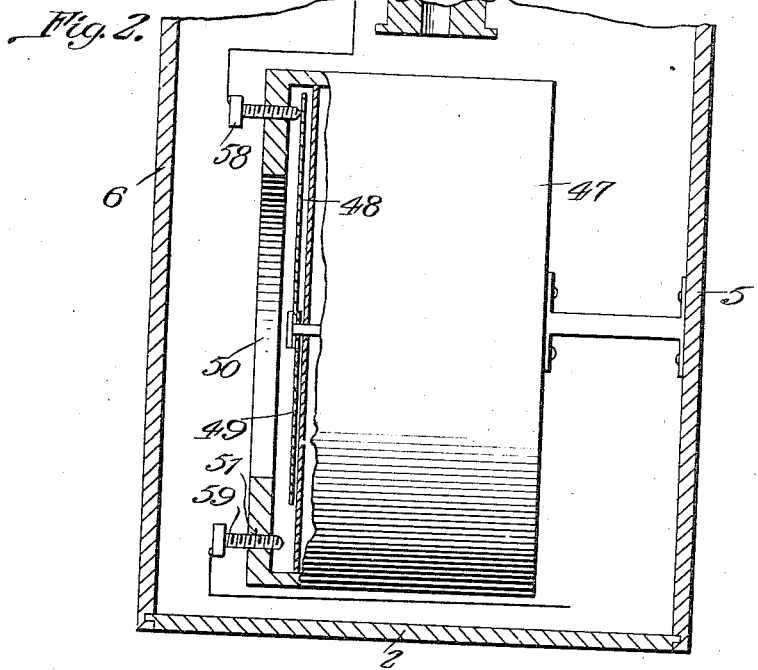
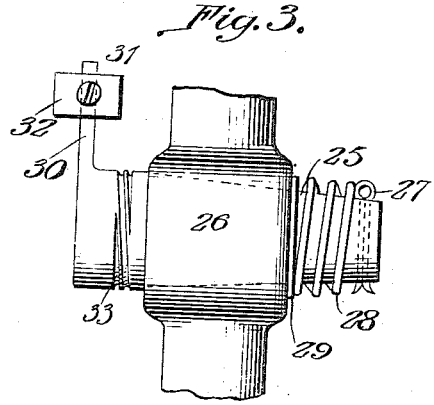
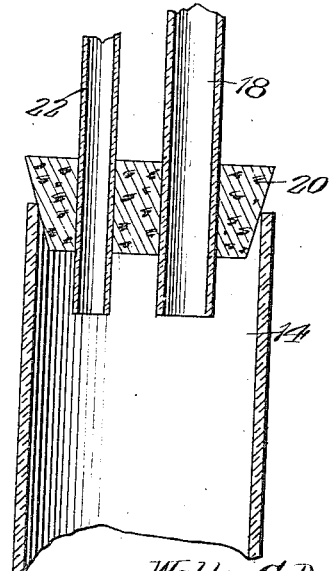
Walter C. Raddant,
Inventor
By Geo. P. Kimmel.
Attorney

UNITED STATES PATENT OFFICE.

WALTER C. RADDANT, OF SANTA LUCIA, CUBA.

AUTOMATIC CONTINUOUS LIQUID-TESTER.

1,266,315.  Specification of Letters Patent.  Patented May 14, 1918.

Application filed June 26, 1916. Serial No. 106,000.

*To all whom it may concern:*

Be it known that I, WALTER C. RADDANT, a citizen of the United States, residing at Santa Lucia, Province of Camaguey, Cuba, have invented certain new and useful Improvements in Automatic Continuous Liquid-Testers, of which the following is a specification.

The present invention relates to the art of chemical testing and more particularly to new and useful improvements in automatic continuous liquid testing devices.

An object of my invention is to provide a testing device of the character mentioned which is adapted to continuously and automatically test liquid, the device being employed to good advantage for testing feed waters for boilers and the like, the device as shown and described hereinafter being employed for indicating the presence of sugar in feed waters for boilers.

Another object of my invention is to provide a testing device of the class described which is adapted by the use of an improved form of time controlled mechanism, to test successively and automatically at predetermined intervals without attention other than to set the time controlling mechanism at the desired time intervals. Of course, it will be understood that the following detail description and the reference to the device as a feed water tester does not mean that I am limited to the application of the device to this use, the device being capable of a wide range of uses.

A further object of my invention is to provide an automatic testing device of the class described which is simple in construction, strong and durable, cheap to manufacture and install and effective in operation.

Other objects and advantages to be derived from the use of my improved automatic continuous liquid testing device will appear from the following detail description and the claims, taken with an inspection of the accompanying drawings, in which:

Fig. 2 is a vertical fragmental sectional view of the time controlling mechanism;

Fig. 3 is an enlarged fragmental side elevational view of one of the valve members; and Fig. 4 is an enlarged fragmental vertical sectional view of a connecting means.

Figure 1:
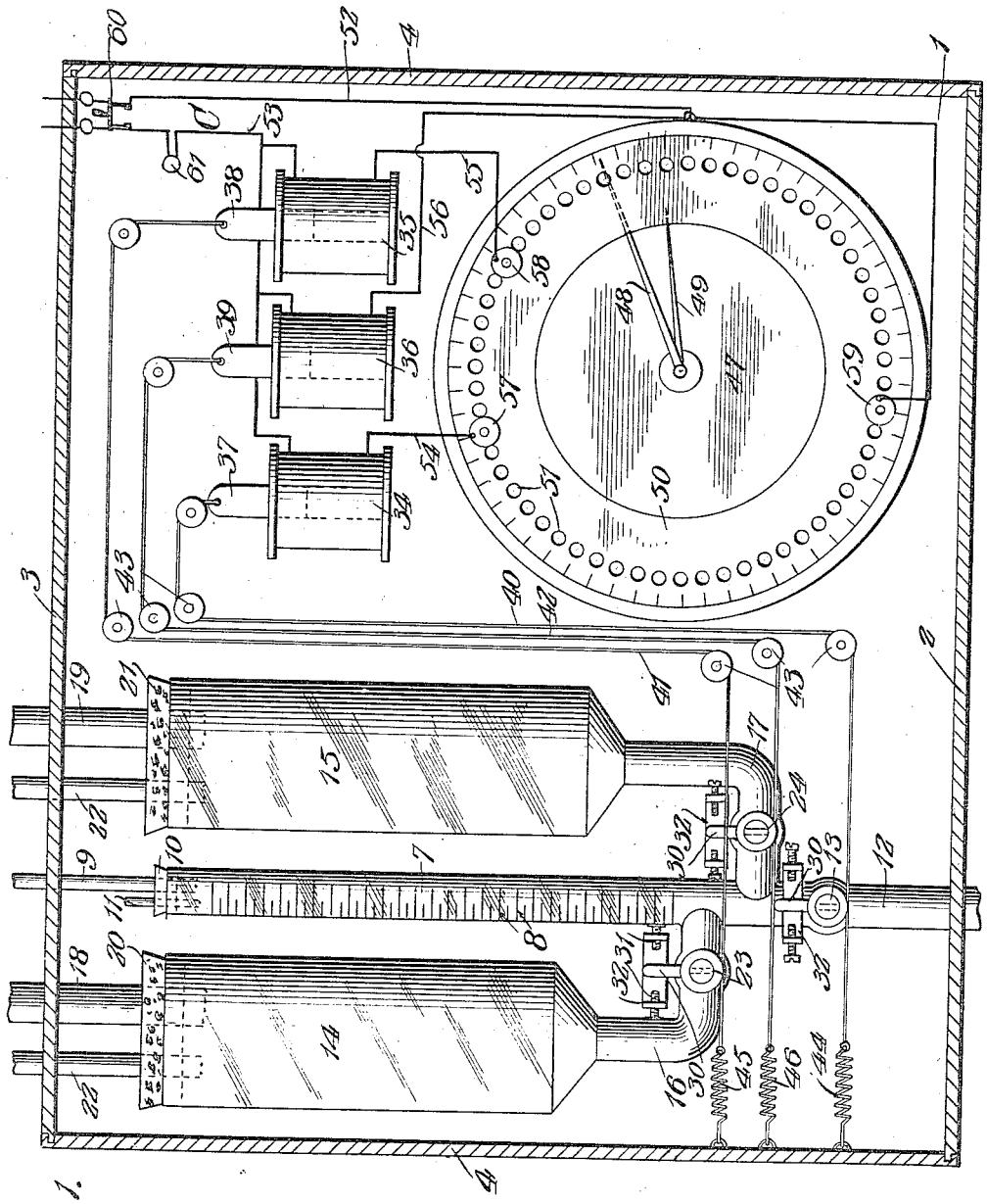
Figure 1 is a vertical sectional view through a housing showing the preferred arrangement of the parts of my invention.

Referring more particularly to the drawings, wherein similar characters of reference designate like and corresponding parts throughout the various views, 1 indicates in its entirety a housing, the same having a bottom and top 2 and 3, respectively, and walls 4, and a rear wall 5. A front wall 6 is provided, the same being removable at times.

The testing device of my invention includes a liquid receiving tube 7 formed of glass or other transparent material arranged vertically in the housing 1 and forming a mixing chamber. The tube 7 is provided exteriorly with graduated marks 8 for indicating the depth of the liquid contents thereof. An inlet pipe 9 communicates with the upper end of the tube 7, said pipe being connected to the tube by means of a cork stopper or the like 10 engaging in the tube, said pipe 9 passing through said cork. A vent pipe 11 also communicates with the tube and is carried by the stopper 10. The pipe 9 may communicate with any suitable source of liquid supply (not shown). The tube 7 is extended downwardly to form an outlet conduit 12 controllable by a turning plug valve 13 arranged therein. The construction of the turning plug is described in detail hereinafter.

I provide two containers 14 and 15 formed of glass or other transparent material, said containers having outlet pipes 16 and 17 communicating with the outlet pipe 12. The containers 14 and 15 are intended to contain the reagents, the container 14 receiving a chemical indicator and the container 15 receiving the acid which is to be combined with the chemical indicator and the liquid to be tested. Inlet pipes 18 and 19 communicate with the containers 14 and 15, said pipes passing through stoppers 20 and 21 formed of cork or the like, similar to the stopper 10 referred to hereinbefore. The structure of this connection is best shown in Fig. 4, wherein the container 14 has been shown and the plug 20. The inlet pipe 18 extends through the plug, and a vent pipe 22 communicates with said container.

A pair of turning plug valves 23 and 24 are interposed in the outlet pipes 16 and 17 of the containers 14 and 15, said valves being described in detail hereinafter and being practically identical in construction with the valve 13. It is to be understood, of course, that I do not limit myself to the exact construction of the inlet pipes or their connection to the containers 14 and 15, this merely illustrating one arrangement of the device.

Referring in detail to the valves 13, 23 and 24, the construction of one of which is best shown in Fig. 3, I provide a valve stem 25 extending through an enlargement 26 formed on the conduit, which may be the conduit 12 or the pipes 16 and 17. The valve stem 25 is of the tapering type, a cotter pin 27 being arranged in the smaller end thereof, which end projects beyond the head of the enlargement 26, a coil spring element 28 being interposed between said pin and the enlargement 26 for maintaining the valve stem snugly in the enlargement. A washer 29 receives the pressure of the spring. The opposite end of the valve stem 25 is provided with a laterally extending movement limiting arm 30 which is adapted to contact alternately with oppositely arranged screws 31 carried in a bracket 32. The valve stem 25 is also provided with a spiral groove 33 for a purpose which will hereinafter appear.

The time controlled mechanism of my invention includes a plurality of electromagnets 34, 35 and 36, said magnets being of the solenoid type and having movable cores 37, 38 and 39, respectively. Cables 40, 41 and 42 are connected with the cores 37, 38 and 39, said cables being trained over a plurality of sets of guide pulleys 43, the cables being convoluted about the valve stems of their respective valves 13, 23 and 24, the grooves in said valve stems serving to accommodate said cables. The free ends of the cables are connected to coiled retractile springs 44, 45 and 46 for returning the valves to closed position after an actuation.

The time controlled mechanism includes an ordinary clock 47 having the usual minute and hour hands 48 and 49 and being specially modified to close the respective circuits of the electro-magnets 34, 35 and 36, whereby to energize the latter.

The circuit closing mechanism referred to includes an insulating ring member 50 provided with a plurality of circumferentially arranged threaded openings 51 spaced at intervals conforming to minutes, or any desired intervals of time. The clock 47 is grounded to one side of an electrical circuit C by means of a conductor 52. The conductor 53 forming the other side of the supply circuit C is provided with branches equal in number to the number of electro-magnets. The other ends of the electro-magnets are connected by means of conductors 54, 55 and 56 to contact screws 57, 58 and 59, said screws being arranged in certain of the openings 51, the inner free ends of the screws projecting into the path of movement of the minute hand 48, as best shown in Fig. 2.

The circuit C is controlled by a main switch 60 and a lamp resistance 61 is interposed in series with the electro-magnetic circuit. Of course, batteries may be employed in lieu of the high voltage circuit C.

In use the liquid to be tested is supplied to the mixing tube 7 through the pipe 9. At a predetermined moment the minute hand 48 will contact with the screw 58. This energizes the electro-magnet 35 exerting a pull on the cable 41 and opening the valve 23. This permits some of the chemical indicator to flow from the container 14 to the mixing chamber. After a predetermined interval of time has elapsed the hand 48 reaches the contact screw 59 which causes the valve 24 to be opened by virtue of the energization of the electro-magnet 36 permitting some of the contents of the chamber 15 to flow through the pipe 17 into the mixing tube 7 and combine with the liquid contents thereof.

After a further interval of time has elapsed the minute hand 48 reaches the contact screw 57, energizing the electro-magnet 34, and by virtue of the cable 40 causes the valve 13 to open. Of course, it is to be understood that the valves only remain open while the minute hand is in contact with the screws 57, 58 or 59 as the case may be, the valves immediately closing by virtue of their respective retractile springs 44, 45 and 46. However, the valve 13 remains open a sufficient time to permit all of the contents of the tube to flow therefrom through the outlet 12 and permitting some of the incoming liquid to wash the tube before the valve closes. At this time the device is ready for another test which will take place in the same order as the test previously described. No attention is necessary other than to place the screws 57, 58 and 59 in the desired openings to regulate the intervals of time.

It is to be understood that the tube 7, outlet 12, pipes 16 and 17 and the containers 14 and 15 may be all cast integral, but of course I do not limit myself to this construction. The electro-magnets and their respective cables, pulleys and the springs 44, 45 and 46 may be mounted in any preferred manner, the view of the same shown in Fig. 1 being semi-diagrammatic and merely illustrating one preferred arrangement of the electro-magnets. In the use of my invention it will be readily apparent to those skilled in the art that the continuous automatic test may be carried on with all kinds of liquid and without continual attention. I do not limit myself to any particular chemical solutions for use in the containers 14 and 15, since any chemical reagents for the particular test to be carried out may be employed.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. A liquid tester, including the combination of a liquid supply conduit, a mixing chamber, a plurality of reagent containers communicating with the mixing chamber, valves controlling such communication of the reagent containers with the mixing chamber, electro-magnets operatively connected with said valves, and time controlled mechanism interposed in the respective electrical circuits of said magnets for the purpose specified.

2. In a liquid testing device, the combination of a mixing tube, a pair of containers, means affording communication between said containers and said tube, controlling valves therefor, time controlled mechanism for actuating said valves, said time controlled mechanism being adjustable to vary the intervals of time between testing operations.

3. In a liquid testing device, the combination of a mixing tube, chemical reagent containers communicating therewith, controlling valves interposed between said containers and said tube, a plurality of electro-magnets operatively connected with said valves, and time controlled circuit closing means for energizing said electro-magnets at predetermined intervals for opening and closing said valves.

4. In a liquid testing device, the combination of a mixing tube, a pair of containers adapted to receive chemical reagents communicating with said tube, valve means interposed between the containers and said tube, a plurality of electro-magnets for opening and closing said valves, and time controlled mechanism for said electro-magnets.

In testimony whereof I affix my signature hereto.

WALTER C. RADDANT.